US008629790B2

(12) United States Patent
Oh

(10) Patent No.: US 8,629,790 B2
(45) Date of Patent: Jan. 14, 2014

(54) LETTER INPUT STRUCTURE USING MORSE CODE AND INPUT METHOD OF THE SAME

(76) Inventor: Maeng Won Oh, Gunsan (KR)

( * ) Notice: Subject to any disclaimer, the term of this patent is extended or adjusted under 35 U.S.C. 154(b) by 1080 days.

(21) Appl. No.: 11/980,706

(22) Filed: Oct. 31, 2007

(65) Prior Publication Data
US 2008/0258941 A1    Oct. 23, 2008

(30) Foreign Application Priority Data

Apr. 20, 2007  (KR) ........................ 10-2007-0038710

(51) Int. Cl.
| | |
|---|---|
| *H03M 11/00* | (2006.01) |
| *H03K 17/94* | (2006.01) |
| *G06F 3/02* | (2006.01) |
| *G09G 5/00* | (2006.01) |
| *H04L 15/04* | (2006.01) |
| *H04L 17/04* | (2006.01) |

(52) U.S. Cl.
USPC ............... 341/22; 341/28; 345/169; 345/172; 178/17 C; 178/30; 178/33 A

(58) Field of Classification Search
USPC ...... 178/4, 17 C, 23 R, 30, 33; 715/702, 865; 345/168, 171; 341/22–35, 51; 400/482–486; 379/367–370; 725/57; 348/734; 708/142–146
See application file for complete search history.

(56) References Cited

U.S. PATENT DOCUMENTS

| | | | | |
|---|---|---|---|---|
| 6,378,234 | B1 * | 4/2002 | Luo | ................................. 341/22 |
| 2006/0199601 | A1 * | 9/2006 | Cho | .............................. 455/466 |
| 2008/0204282 | A1 * | 8/2008 | Jeon | ................................ 341/22 |

FOREIGN PATENT DOCUMENTS

JP          2002123358        *  3/2002

* cited by examiner

*Primary Examiner* — Mohammad Ghayour
*Assistant Examiner* — Jerold Murphy
(74) *Attorney, Agent, or Firm* — Edwards Wildman Palmer LLP

(57) ABSTRACT

A letter input structure of a two-click keyboard adapting a Morse code and an input method of the same, and a recording medium of the method are disclosed. A certain letter is created in selective combination with two keypads among seven keypads consisting of a dot(•) group keypad of a dot(•) keypad, a dot dot(•) keypad and a dot dot dot(•) keypad of a Morse code, a dash(-) group keypad of a dash(-) keypad, a dash dash(- -) keypad, and a dash dash dash (- - -) keypad which are separated and arranged at left and right sides (or upper and lower sides) and one function keypad.

7 Claims, 7 Drawing Sheets

| Korean (English) | Morse code | Korean (English) | Morse code | Korean (English) | Morse code | Korean (English) | Morse code |
|---|---|---|---|---|---|---|---|
| ㄱ (I) | ** | ㄴ (M) | - - | ㅏ (E) | * | ㅓ (T) | - |
| ㄷ (U) | ** - | ㄹ (G) | - - * | ㅗ (A) | * - | ㅜ (N) | - * |
| ㅁ (H) | ** - - | ㅂ (Z) | - - ** | ㅡ (W) | * - - | ㅣ (D) | - ** |
| ㅅ (S) | *** | ㅇ (O) | - - - | ㅑ (J) | * - - - | ㅕ (B) | - *** |
| ㅈ (R) | ** - - - | ㅊ (K) | - - *** | ㅛ (V) | *** - | ㅠ (C) | - - - * |
| ㅋ (L) | *** - - | ㅌ (Y) | - - - ** | ㅐ (P) | ***** | ㅔ (X) | - - - - - |
| ㅍ (F) | *** - - - | ㅎ (Q) | - - - *** | | | | |

LETTER INPUT STRUCTURE USING MORSE CODE AND INPUT METHOD OF THE SAME

TECHNICAL FIELD

The present invention relates to a letter input structure of a two-click keyboard using a Morse code and an input method of the same, and a recording medium of the same, and in particular to a letter input structure of a two-click keyboard using a Morse code and an input method of the same, and a recording medium of the same in which it is possible to easily input Korean letters, English letters, special letters and other country letters using a two-click keyboard made by improving a conventional Morse code.

BACKGROUND ART

Along with a sharp increase in a mobile internet industry, the use of a portable terminal such as a cellular phone, a PCS, a PDA, a PMP, a PSP, an electronic dictionary, a navigation terminal, UMPC, a laptop computer, etc. increases. So, various methods are developed for an easier letter input. However, still a certain letter input method, which is able to meet the needs for a convenience, quickness, accuracy and mobility, is urgently needed.

In a conventional letter input method of a potable terminal, there are a method in which letters are inputted step by step by searching and pressing the letters which are allocated to the numbers of 0 through 9, a method which uses a Qwerty keyboard or a LCD touch screen along with the Qwerty keyboard, and a method which uses a foldable keyboard.

When it is needed to transmit a SMS using a potable terminal, a user changes the potable terminal to a SMS input mode and inputs a certain message. In the calling mode, a keypad conventionally used as a dial button is used as a keyboard for a letter input.

For a Korean input method, various methods are disclosed. The Korean letter input method used in a conventional potable terminal is generally classified into a method in which consonants and vowels are separately inputted based on a so-called ChunJiln method for thereby combining and creating a certain letter, and a method in which a consonant and a finished vowel are separately inputted based on a so-called EuddumHangul method for thereby combining and creating a certain letter.

In the ChunJiln input method, the buttons of consonants and vowels are separated in the keypad of the potable terminal. "], •, -" corresponding to the vowels are allocated to the 1, 2, 3 keypads. The consonants are allocated to "4~9, 0" keypads. So, a certain letter is combined with the consonants and vowels. In particular, since it is possible to express all vowels with only three buttons, a letter input on the potable terminal is easy.

In the EuddumHangul input method, a first input of the keyboard is performed with a consonant all the time. The first consonant of the next letter, which was finished with a first consonant and a final consonant of the first letter, is combined with a vowel all the time. So, a certain letter is combined with a vowel finished with a consonant based on a combined keyboard, so that it is easy to input a certain letter on the cellular phone.

However, since the consonants and vowels are set together on one keypad in the conventional Korean letter input method, a letter input motion occurs between far-spaced keys during the input of a letter.

In the English input method, 2~4 English letters are allocated to one number keypad in the potable terminal which usually does not have a Qwerty keyboard, and a certain key is pressed once or two through four times in series for inputting a certain letter for thereby creating the letter. In the letter groups allocated to the same number keys, it is possible to input the next letter after a certain pressing time interval or by pressing a spacing key.

Therefore, when a certain key is repeatedly pressed or a certain time difference is provided for inputting the next letter as compared to the Qwerty keyboard, an input speed may decrease. As the portable terminal is compact-sized, even when a Qwerty keyboard is provided, the size of the Qwerty keyboard should be made smaller in proportion to the size of the terminal, so that it may still have a problem in an outer appearance or when it is used.

In the Morse communication method which may have a certain restriction in its use, there is a method for transmitting a letter converted into a Morse code using an intermittent time difference at contact points by using a Morse key with two electrical signals consisting of a dot and a dash having a length three times of the dot. It is possible to easily input a Korean, English or a special letter with one hand by adapting the above method to a keypad. In this case, the number of keypads used for inputting letters may decrease. However, the number of the key pressing actions significantly increases, so that a lot of work is needed for inputting one letter. In addition, it is needed to memorize all of the Morse codes corresponding to each letter.

DISCLOSURE OF THE INVENTION

Accordingly, it is an object of the present invention to provide a letter input structure of a two-click keyboard using a Morse code and an input method of the same which overcomes the above problems encountered in the conventional art.

It is another object of the present invention to provide a letter input structure of a two-click keyboard using a Morse code and an input method of the same in which it is possible to easily input a Korean letter, English letter, special letter or the letters of other countries using a two-click keyboard having dot(•) keypad and a dash(-) keypad for inputting dot and dash codes instead of using a Morse key and function keys used for separating codes for time differences.

To achieve the above objects, in a letter input structure of an input means, there is provided a letter input structure of a two-click keyboard adapting a Morse code characterized in that at least one serial dot(•) keypad in a Morse code and at least one serial dash(-) keypad in a Morse code are separated and arranged at left and right sides or upper and lower sides of the input means, so that a certain letter is created in such a manner that at least one keypad is pressed among at least one serial dash(-) keypad after at least one keypad is pressed among at least one serial dot(•) keypad or at least one keypad is pressed among at least one serial dot(•) keypad after at least one keypad is pressed among at least one serial dash(-) keypad.

To achieve the above objects, there is provided a letter input structure of a two-click keyboard adapting a Morse code characterized in that a dot(•) group keypad consisting of a dot(•) keypad, a dot dot(• •) keypad and a dot dot dot(• • •) keypad of a Morse code and a dash(-) group keypad consisting of a dash(-) keypad, a dash dash(- -) keypad and a dash dash dash(- - -) keypad are separated and arranged at left and right sides and upper and right sides of an input means, so that a letter is created in such a manner that a certain keypad among the dash(-) group keypad is inputted after a certain keypad among the dot(•) group keypad is inputted or a certain keypad among the dot(•) group keypad is inputted after a certain keypad among the dash(-) keypad is inputted.

To achieve the above objects, in a letter input method of an input means which includes keypads corresponding to at least one serial dot(•) code in a Morse code and at least one serial dash(-) code in a Morse code, there is provided a letter input method of a two-click keyboard adapting a Morse code which comprises a step in which a letter is created in such a manner that at last one dash(-) code is inputted after at least one dot(•) code in a Morse code is inputted or at least one dot(*) code is inputted after at least one dash(-) code in a Morse code is inputted.

There is provided a recording medium accessible by a computer which comprises a program in which at least one dot(•) code or a dash(-) code inputted based on a letter input structure of a two-click keyboard adapting a Morse code or a letter input method of a two-click keyboard adapting a Morse code is converted into a Korean letter, an English letter, a special letter or other country letters.

In the conventional art, a certain key is pressed one time or few times for inputting a Korean consonant or vowel and an English alphabet in the two-click keyboard, but in the two-click keyboard according to the present invention, it is needed to press a certain key at least two times for thereby creating a desired letter.

The Morse code of the two-click keyboard according to the present invention is obtained by improving the conventional Morse code system of FIG. 1 to the Morse code system of FIG. 4. Namely, in the present invention, two keys are selected from the dot(•) code group keypad and the dash(-) code group keypad and are combined for thereby creating Korean consonants or vowels and English letters by improving the conventional art in which the dot(•) codes and the dash(-) codes are combined in a complicated method when creating Korean consonants or vowels and English letters such as Koreans of "ㅈ", "ㅔ" and English letters of "R", "X".

BRIEF DESCRIPTION OF THE DRAWINGS

The present invention will become better understood with reference to the accompanying drawings which are given only by way of illustration and thus are not limitative of the present invention, wherein;

Figure 1:
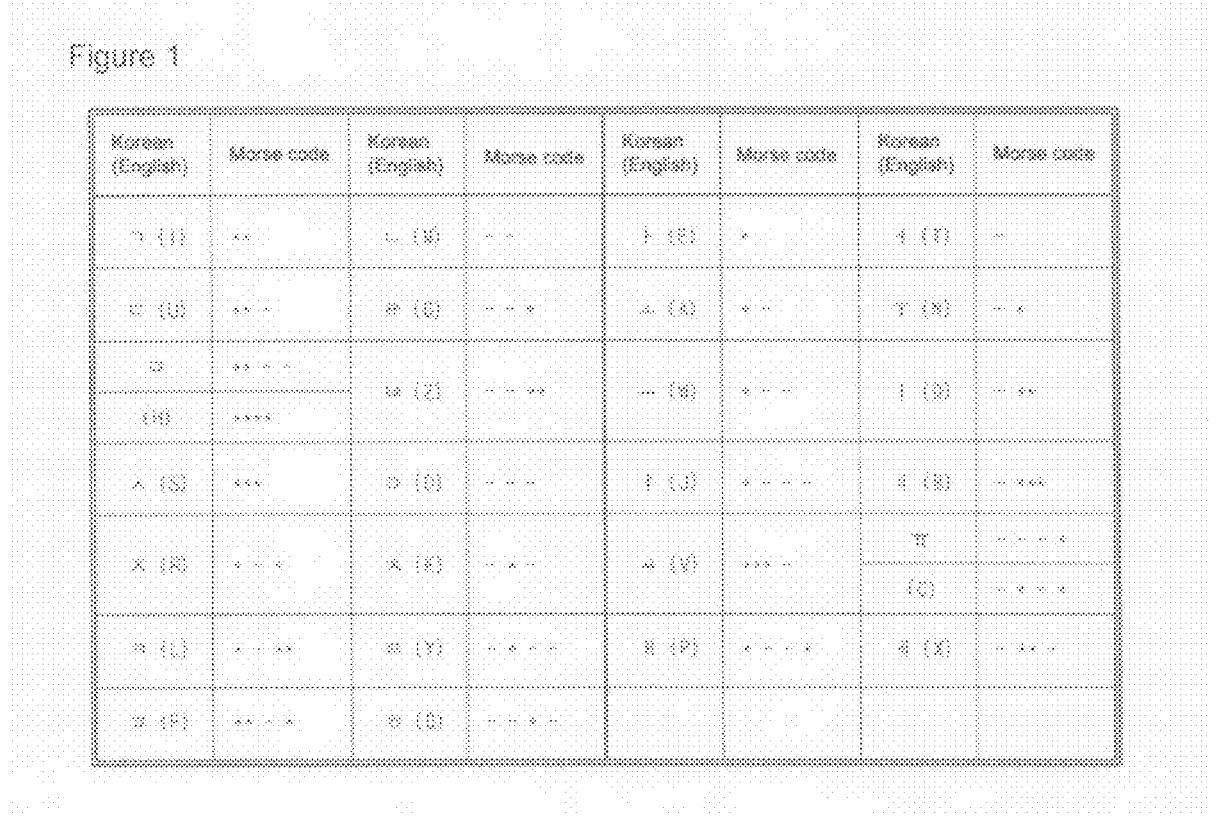

FIG. 1 is a view illustrating a Korean letter and an English letter corresponding to a conventional Morse code;

MODES FOR CARRYING OUT THE INVENTION

The letter input structure using a two-click Morse code and an input method of the same according to an embodiment of the present invention will be described with reference to the accompanying drawings.

Figure 2:
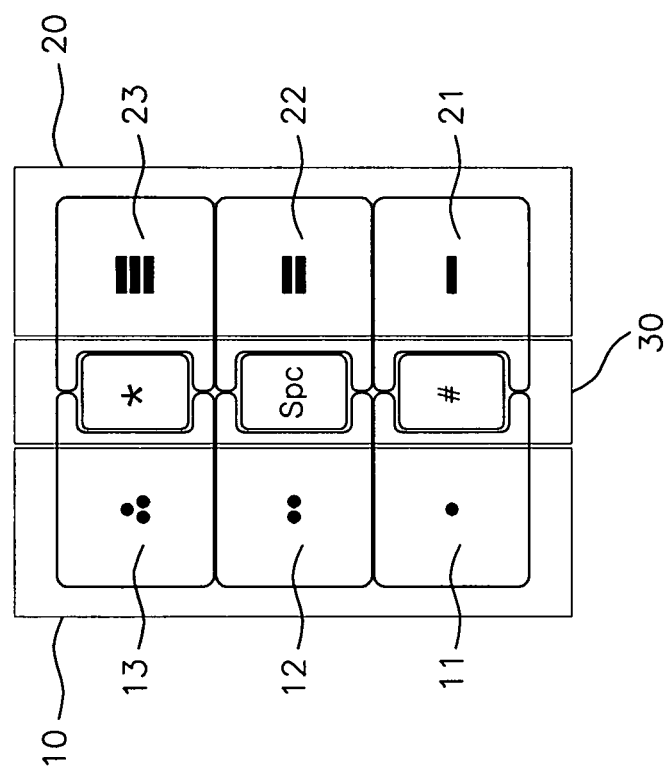
FIG. 2 is a view illustrating a letter input structure of a two-click keyboard adapting a Morse code according to an embodiment of the present invention.

FIG. 2 is a view illustrating a letter input structure using a two-click Morse code according to an embodiment of the present invention. The letter input structure using a two-click Morse code (hereinafter referred to as "two-click keyboard") according to the present invention will be described in details.

The two-click keyboard according to the present invention may be provided as an input member for a computer, a cellular phone, a smart phone, a PDA, a PMP, a PSP, an electronic dictionary, a UMPC, a laptop computer, etc. or may be provided as an input member which is separately made based on the objects of the present invention.

The constructions of the two-click keyboard according to the present invention will be described.

At least one dot(•) keypad corresponding to a dot(•) in the Morse code is provided. As shown in FIG. 2, at least one serial dot(•) code in the Morse code may be formed like a dot(•) keypad 11, a dot dot (• •) keypad 12 and a dot dot dot(• • •) keypad 13.

In addition, at least one dash(-) keypad corresponding to a dash(-) in the Morse code is provided. As shown in FIG. 2, at least one serial dash(-) code in the Morse code may be formed like a dash(-) keypad 21, a dash dash(- -) keypad 22 and a dash dash dash (- - -) keypad 23.

Here, the construction of the dot(•) code and the dash(-) of the two-click keyboard adapted as an input member is not limited to the disclosed construction, and it is obvious that those who skilled in the art may modify in various forms.

Those who skilled in the art may modify the dot(•) code and the dash(-) code in a form of "0" or "1" or may modify the dot(•) code in a form of "1" or the dot dot(• •) code in a form of "2" or the dot dot dot(• • •) in a form of "3" or the dash(-) in a form of "4" or the dash dash(- -) in a form of "5" or the dash dash dash(- - -) in a form of "6".

As shown in FIG. 2, the two-click keyboard adapting the above input member is arranged by separating one serial dot(•) code and the dash(-) code into left and right sides of the input member.

So, it is possible to create a Korean letter, an English letter, a special letter or other country letters by selecting and combining at two keypads among least one serial dot(•) keypad and at least on serial dash(-) keypad.

In particular, when at least one dot(•) code or at least one dash(-) is inputted, the input member may further include a program for converting the code into a Korean letter, an English letter, a special letter or other country letters.

The dot(•) code and the dash(-) code provided on the two-click keyboard may be formed on the keypads of the input member in an embossing method or an engraving method, so that an ordinary person or a disabled person can easily use the products of the present invention. The two-click keyboard may be used for spacing a Korean letter and an English letter or for creating a letter by combining six keys (dot, dot dot, dot dot dot, dash, dash dash, dash dash dash) or may be provided with a certain keypad such as a space keypad, "*" or "#" for separating the Morse codes.

The detailed letter input method of the two-click keyboard will be described later.

Figures 3, 4:
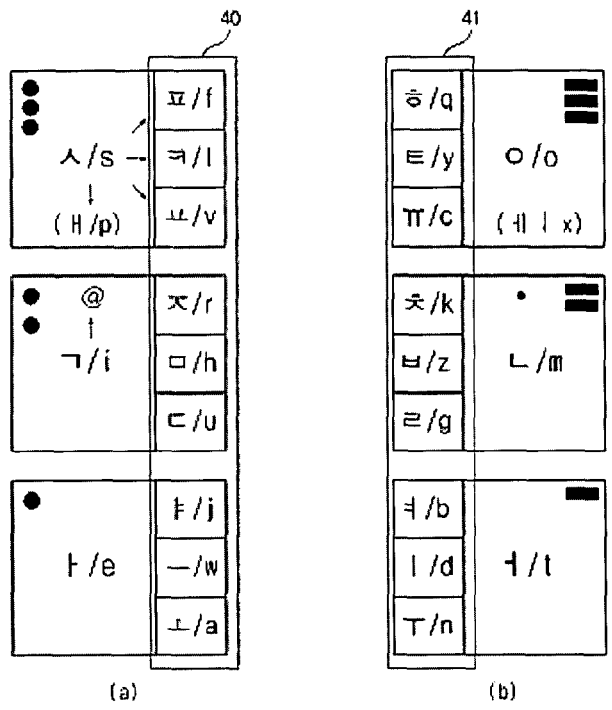
FIG. 3 is a view illustrating a letter input structure of a two-click keyboard adapting a Morse code and an expansion letter having an orientation according to an embodiment of the present invention.
FIG. 4 is a view illustrating a Korean letter and an English letter corresponding to a two-click Morse code according to an embodiment of the present invention.

FIG. 3 is a view illustrating a letter input structure of a two-click keyboard adapting a Morse code and an expansion letter having an orientation according to an embodiment of the present invention. The expansion letter of the two-click Morse keyboard will be described in detail with reference to FIG. 3.

A certain person who knows the conventional Morse codes or the modified Morse codes shown in FIG. 4 can easily use the two-click keyboard of FIG. 2. A person who first handles the two-click keyboard of the present invention can easily input a letter or a code while seeing the two-click keyboard.

As shown in FIG. 3, people can easily input letters by providing basic letters and expansion letters having orientations on the dot keypad and the dash keypad.

In a feature of the two-click keyboard according to the present invention, it is possible to create one letter in combination with one or two keypads selected from seven keypads consisting of six different keypads and one function keypad.

In case of the basic Korean letter, the keypad of the dot(•) code consists of "ㅏ", "ㄱ", "ㅅ", and the keypad of the dash(-) code consists of "ㅓ", "ㄴ", "ㅇ", and the remaining consonants and vowels may consist of expansion letters.

In case of the English, the keypad of the dot(•) code consists of "e", "i", "s", and the keypad of the dash(-) code consists of "t", "m", "o", and the remaining English letters may consist of expansion letters. The keypad of the dot(•) code consists of "A", "S", "U", and the keypad of the dash(-) code consists of "G", "O", "L", and the remaining English letters may consist of expansion letters. The above construction may be modified by those who skilled in the art.

As shown in FIG. 3, the expansion letters 40 and 41 may consist of a Korean letter or an English letter by separating each keypad into upper, middle and lower parts. The concepts of the upper, middle and lower parts are provided for creating a letter having an orientation that a corresponding letter is created by pressing a keypad positioned at the opposite upper, middle and lower parts after a certain keypad corresponding to the basic letter is pressed.

The basic letters and the expansion letters 40 and 41 may be provided through various display members (not shown) connected with the input member.

The above construction will be described in more detail with an example of the Korean letters in the expansion letters 40 and 41 of the two-click Morse keyboard with reference to FIG. 3.

The basic letters are formed in such a manner that the dot(•) keypad 11 of the Morse code consists of the Korean vowel of "ㅏ", and the dot dot(• •) keypad 12 of the Morse code consists of the Korean consonant of "ㄱ", and the dot dot dot(• • •) keypad 13 of the Morse code consists of the Korean consonant of "ㅅ", and the dash (-) keypad 21 of the Morse code consists of the Korean vowel of "ㅓ", and the dash dash(- -) keypad 22 of the Morse code consists of the Korean consonant of "ㄴ", and the dash dash dash(- - -) keypad 23 of the Morse code consists of the Korean consonant of "o".

Each keypad further consists of expansion letters 40 and 41 having orientations so that the Korean vowels or Korean consonants except for the basic letters can be inputted.

As shown in FIG. 3, in the dot(•) keypad 11, the expansion letter "ㅑ" is formed at the upper side of the dot(•) keypad in addition to the basic letter of "ㅏ", and the letter of "-" is provided at the intermediate portion, and the letter of "ㅘ" is provided at the lower portion. So as to input the expansion letter of "ㅑ", the dot(•) keypad 11 in the keypads of the left side dot(•) code is pressed, and the dash dash dash(- - -) keypad 23 provided at the right upper side of the keypad of the right side dash(-) code is pressed for thereby creating the letter of "ㅑ".

The English letter of the expansion letters 40 and 41 of the two-click Morse keyboard according to the present invention will be described in more detail with reference to FIG. 3.

The basic letters are formed in such a manner that the dot(•) keypad 11 of the Morse code consists of the English letter of "e", and the dot dot(• •) keypad 12 of the Morse code consists of the English letter of "i", and the dot dot dot(• • •) keypad 13 of the Morse code consists of the English letter of "s", and the dash(-) keypad 21 of the Morse code consists of the English letter of "t", and the dash dash(- -) keypad 22 of the Morse code consists of the English letter of "m", and the dash dash dash(- - -) keypad 23 of the Morse code consists of the English letter of "o".

Each keypad further consists of the expansion letters 40 and 41 having orientations for inputting the English letters except for the basic letters.

As shown in FIG. 3, in the dot(•) keypad 11, the expansion letter "j" is formed at the upper side of the dot(•) keypad in addition to the basic letter of "e", and the letter of "w" is provided at the intermediate portion, and the letter of "a" is provided at the lower portion. So as to input the expansion letter of "j", the dot(•) keypad 11 in the keypads of the left side dot(•) code is pressed, and the dash dash dash(- - -) keypad 23 provided at the right upper side of the keypad of the right side dash(-) code is pressed for thereby creating the letter of "j".

Figure 8:
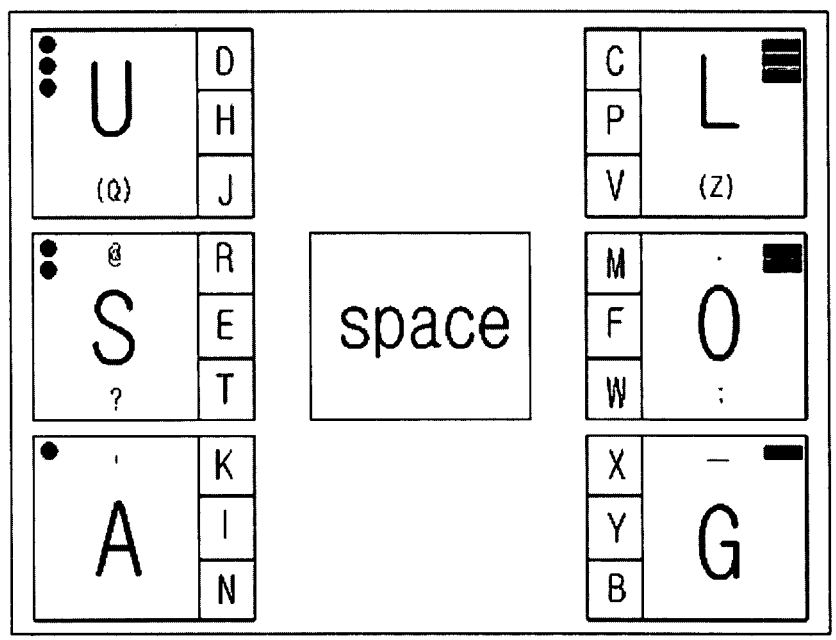
FIG. 8 is a view illustrating another English letter based on an enhanced input speed by improving a two-click Morse code according to an embodiment of the present invention.

FIG. 8 is a view illustrating another English letter having an enhanced input speed by improving the two-click Morse code according to an embodiment of the present invention. As shown in FIG. 8, in the arrangement of the English letters of FIG. 3, the alphabets having a higher frequency are arranged at the left sides in consideration with an English alphabet use frequency, so that the keys arranged at the left and right sides like the Qwerty keyboard are more frequently used for thereby enhancing an input speed.

Namely, the basic letters are formed in such a manner that the dot(•) keypad of the Morse code consists of the English letter of "A", and the dot dot(• •) keypad of the Morse code consists of the English letter of "S", and the dot dot dot(• • •) keypad of the Morse code consists of the English letter of "U", and the dash(-) keypad of the Morse code consists of the English letter of "G", and the dash dash(- -) keypad of the Morse code consists of the English letter of "O", and the dash dash dash(- - -) keypad of the Morse code consists of the English letter of "L".

Each keypad further consists of the expansion letters having orientations for inputting the English letters except for the basic letters as shown in FIG. 8.

As shown in FIG. 8, in the dot(•) keypad, the expansion letter "K" is formed at the upper side of the dot(•) keypad in addition to the basic letter of "A", and the letter of "I" is provided at the intermediate portion, and the letter of "N" is provided at the lower portion. So as to input the expansion letter of "K", the dot(•) keypad in the keypads of the left side dot(•) code is pressed, and the dash dash dash(- - -) keypad provided at the right upper side of the keypad of the right side dash(-) code is pressed for thereby creating the letter of "K".

Figure 5:
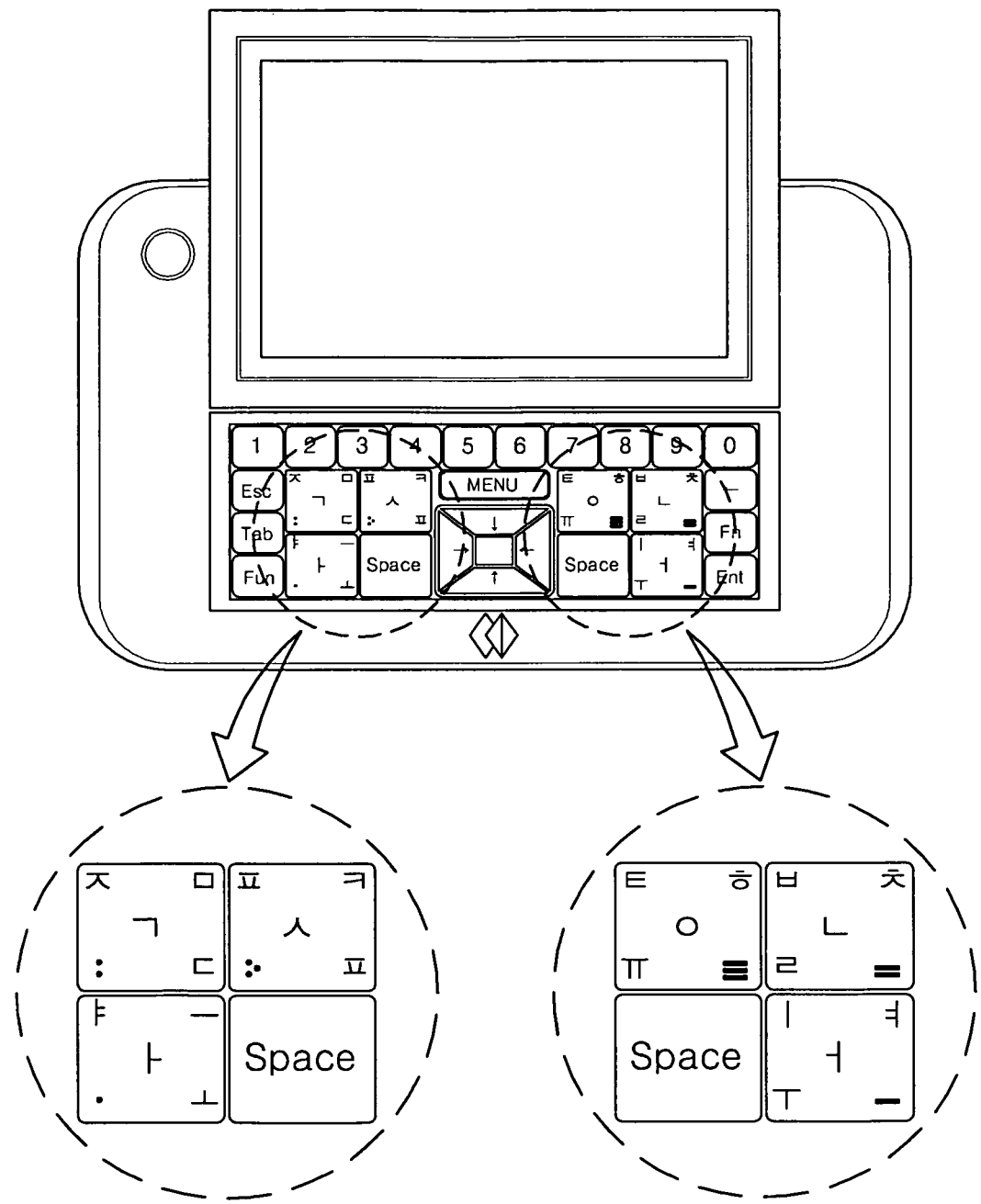
FIG. 5 is a view illustrating a terminal adapting a letter input structure using a two-click Morse code according to an embodiment of the present invention.
Figure 6:
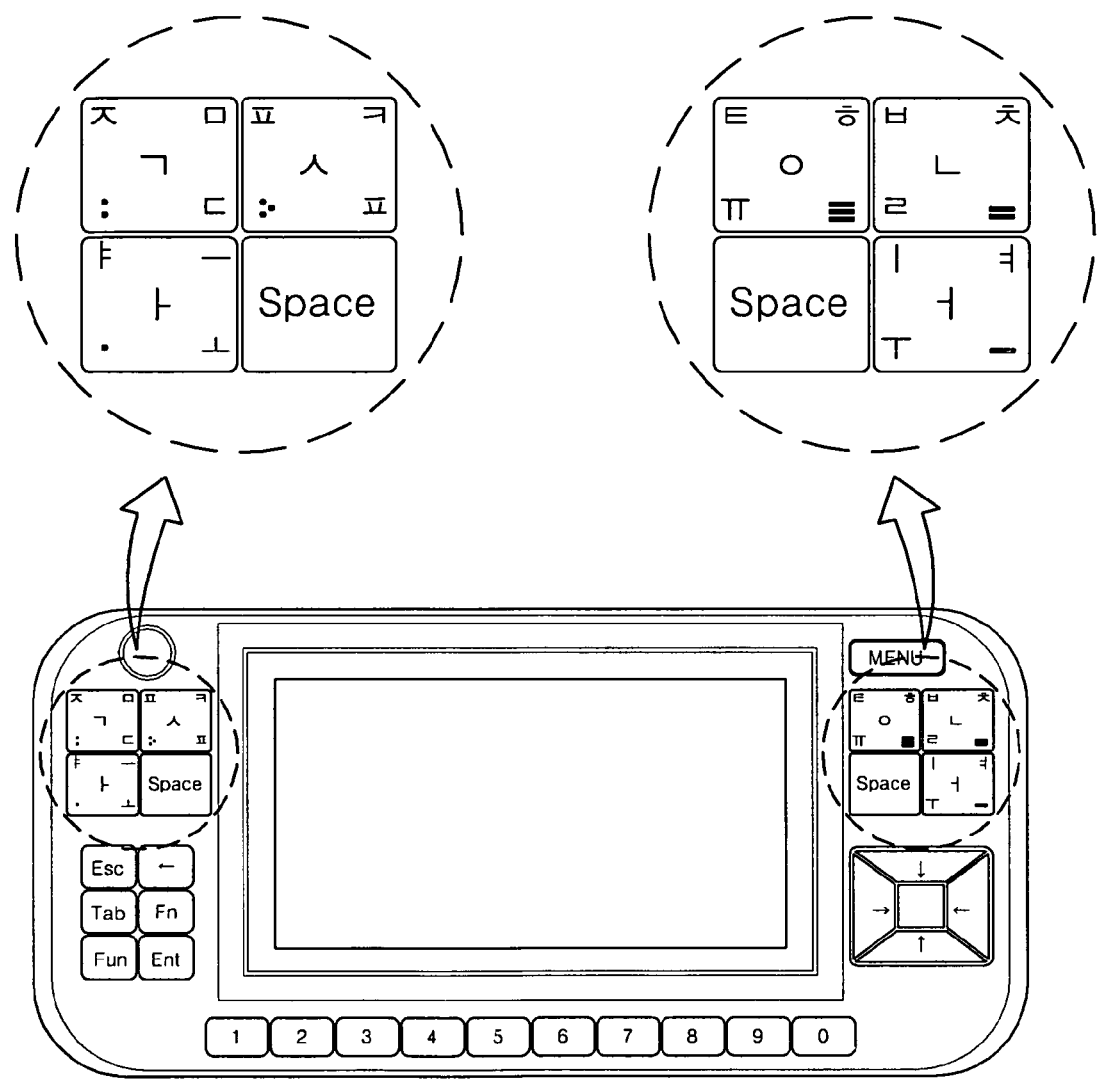
FIG. 6 is a view illustrating another terminal adapting a letter input structure using a two-click Morse code according to an embodiment of the present invention.
Figure 7:
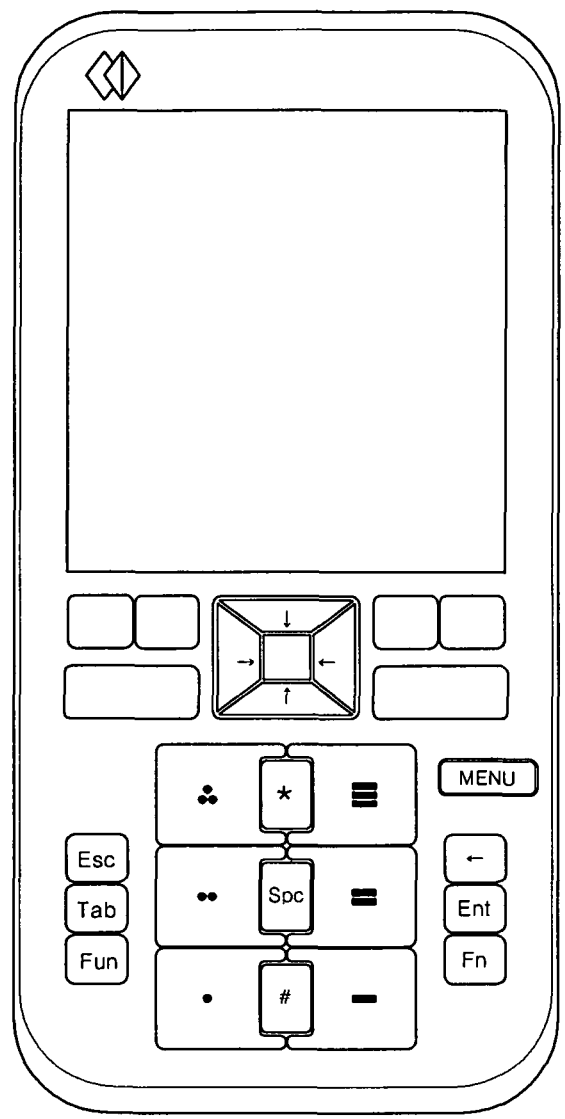
FIG. 7 is a view illustrating further another terminal adapting a letter input structure using a two-click Morse code according to an embodiment of the present invention.

FIG. 5 is a view illustrating a terminal adapting a letter input structure using a two-click Morse code according to an embodiment of the present invention. FIG. 6 is a view illustrating another terminal adapting a letter input structure using a two-click Morse code according to an embodiment of the present invention. FIG. 7 is a view illustrating further another terminal adapting a letter input structure using a two-click Morse code according to an embodiment of the present invention.

It is obvious that those who skilled in the art can adapt the Korean letter, English letter, special letter or other country letters to the two-click keyboard according to the present invention.

The letter input method of the two-click keyboard according to the present invention will be described in detail with reference to the accompanying drawings.

FIG. 4 is a view illustrating a Korean letter and an English letter corresponding to a two-click Morse code according to an embodiment of the present invention. The letter input method using a two-click keyboard will be described in detail with reference to FIGS. 2 through 4.

Assuming that the Korean "진" is to be inputted, the dot dot(• •) keypad 12 and the dash dash dash(- - -) keypad 23 are sequentially pressed so as to input the letter "ㅈ", and the dash(-) keypad 12 and the dot dot(• •) keypad 12 are sequentially pressed so as to input the letter "ㅣ", ", and the dash dash(- -) keypad 22 and certain keypads are sequentially pressed so as to input the letter "ㄴ" for thereby creasing the letter "진".

Assuming that the English "LOVE" is to be inputted, the dot dot dot(• ••) keypad 13 and the dash dash(- -) keypad 22 are sequentially pressed so as to input the letter "L", and the dash dash dash(- - -) keypad 23 and certain keypads are sequentially pressed so as to input the letter of "O", and the dot dot dot(• • •) keypad 13 and the dash(-) keypad 21 are sequentially inputted so as to input the letter of "V", and the dot(•) keypad 11 and certain keypads are sequentially pressed so as to input the letter of "E" for thereby creating the letter of "LOVE".

Assuming that the letter of "@" is to be inputted, the dot dot(• •) keypad 12 and the dot dot dot((• • •) keypad 13 are sequentially pressed for thereby creating the letter of "@".

For spacing words, it is needed to press the space keypad or the keypad of "*" or "#". For inputting the basic letters of the Korean letters or English letters, it is needed to press a corresponding keypad twice or to input a corresponding letter in combination with a certain key.

As described above, in the letter input structure adapting a two-click code and an input method of the same according to the present invention, an ordinary person as well as a disabled person (eyesight, hands) can easily input a Korean letter or an English letter by providing a two-click keyboard adapting a Morse code.

It is possible to input letters with one hand while a vehicle is being moved by significantly decreasing the number of keyboards (or keypads), not depending on a vision ability in the present invention. The two-click keyboard according to the present invention may be adapted to a human body-mounted keyboard, so that it is possible to input letters with one hand.

In addition, the product may be made small-sized by adapting the two-click keyboard. A desired letter can be easily inputted by simply adapting other country letters to the two-click keyboard of the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A letter input structure for an input means comprising: a letter input structure including a two-click keyboard adapting a Morse code characterized in that a dot (•) group consisting of a dot (•) keypad, a dot dot (• •) keypad and a dot dot dot (• • •) keypad of a Morse code and a dash(-) group consisting of a dash (-) keypad, a dash dash (- -) keypad and a dash dash dash (- - -) keypad are separated and arranged on left and right sides of the input means respectively, a group of non-Morse code keypads separating the dot group and the dash group and the dot (•) group, the dash (-) group and the group of non-Morse code keypads are disposed as respective keypad columns on the input means, and wherein respective dot (•) and dash (-) group keypads are each assigned one basic letter and three expansion letters, and the three expansion letters are positioned in a column on the side of the keypad closest to the opposite Morse group keypads, wherein a keypad of the dash (-) group is inputted after a keypad of the dot (•) group is inputted or a space keypad is input after one of a keypad of the dot (•) group or a key pad of the dash (-) group, and an input of a basic letter is accomplished by the space keypad being inputted after one of a keypad of the dot (•) group or a keypad of the dash (-) group and the input of an expansion letter is accomplished by the opposite Morse code group keypad that corresponds to the column position of the expansion letter is inputted after the dot (•) group or the dash (-) group keypad of the expansion letter.

2. The structure of claim 1, wherein said input means provides an expansion letter having an orientation so that a Korean letter or an English letter is inputted through a display means.

3. The structure of claim 1, wherein basic letters are formed in such a manner that a dot (•) keypad of the Morse code consists of the Korean vowel of "ㅏ", and a dot dot (• •) keypad of the Morse code consists of the Korean consonant of "ㄱ", and a dot dot dot (• ••) keypad of the Morse code consists of the Korean consonant of "ㅅ", and a dash (-) keypad of the Morse code consists of the Korean vowel of "ㅓ", and a dash dash (- -) keypad of the Morse code consists of the Korean consonant of "ㄴ", and a dash dash dash (- - -) keypad of the Morse code consists of the Korean consonant of "o", and each keypad further consists of expansion letters having orientations so that the Korean vowels or Korean consonants except for the basic letters can be inputted.

4. The structure of claim 1, wherein basic letters are formed in such a manner that the dot (•) keypad of the Morse code consists of the English letter of "e", and the dot dot (• •) keypad of the Morse code consists of the English letter of "i", and the dot dot dot (• ••) keypad of the Morse code consists of the English letter of "s", and the dash (-) keypad of the Morse code consists of the English letter of "t", and the dash dash (- -) keypad of the Morse code consists of the English letter of "m", and the dash dash dash (- - -) keypad of the Morse code consists of the English letter of "o", and each keypad further consists of the expansion letters having orientations for inputting the English letters except for the basic letters.

5. The structure of one among claims 1, 3 and 4, wherein a dot (•), a dash (-), a Korean letter and an English letter are formed on a keypad by one method selected among an embossing method, an engraving method, and a printing method.

6. The structure of claim 1, wherein said space keypad further performs a spacing-word function of Morse code.

7. The structure of claim 1, wherein said dot (•) keypad and said dash (-) keypad are formed of a keypad corresponding to the dot (•) code and a keypad corresponding to the dash (-) code, respectively.

\* \* \* \* \*